F. W. LEIB.
WHEEL.
APPLICATION FILED MAY 3, 1912.
1,082,600.
Patented Dec. 30, 1913.
3 SHEETS—SHEET 1.
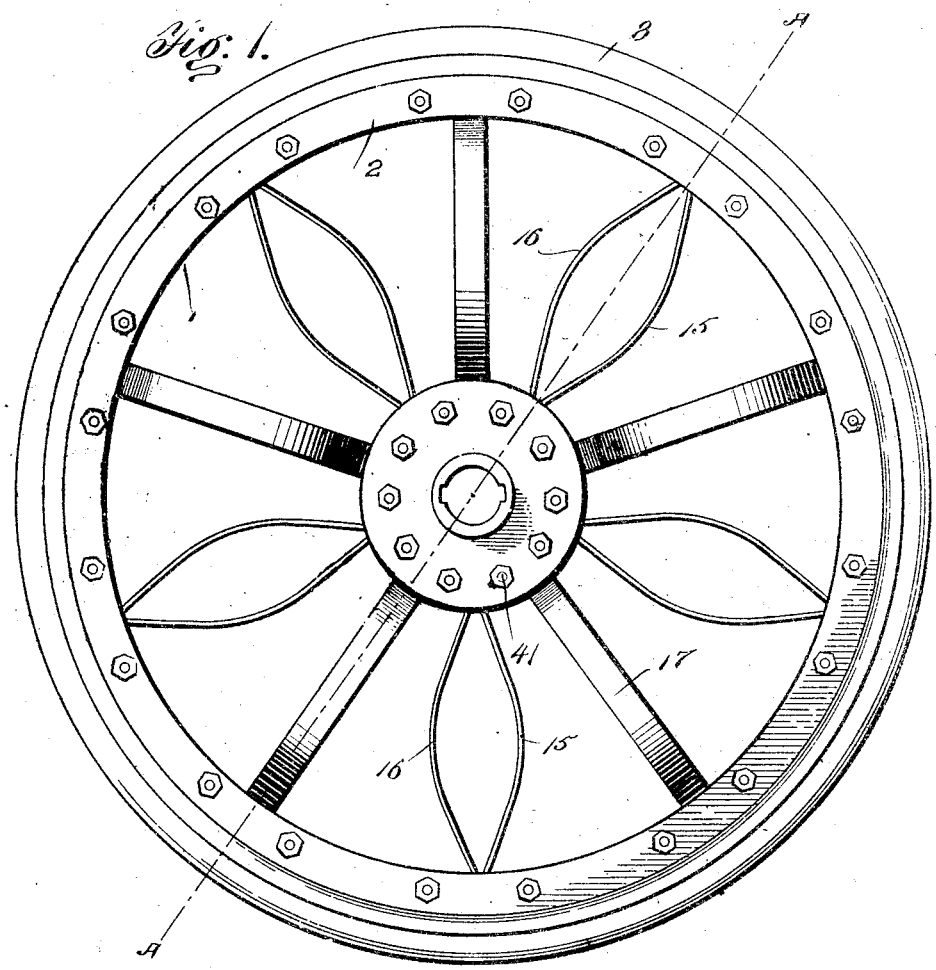
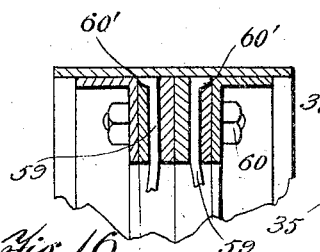
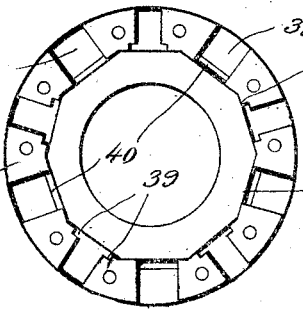
Witnesses
M. P. McKee
G. C. Tracy
Inventor
F. W. Leib
By Alex. J. Wedderburn, Jr.
Attorney

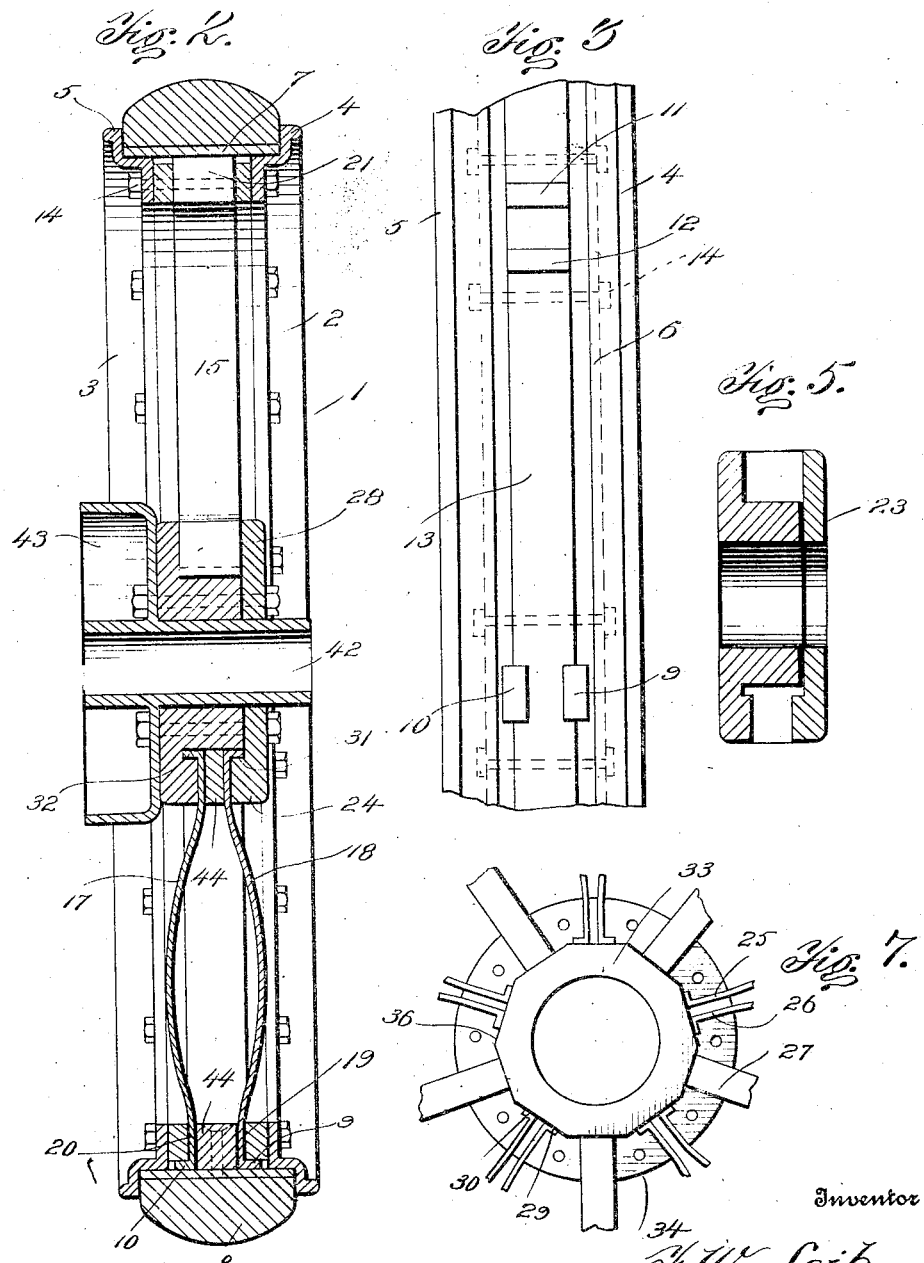

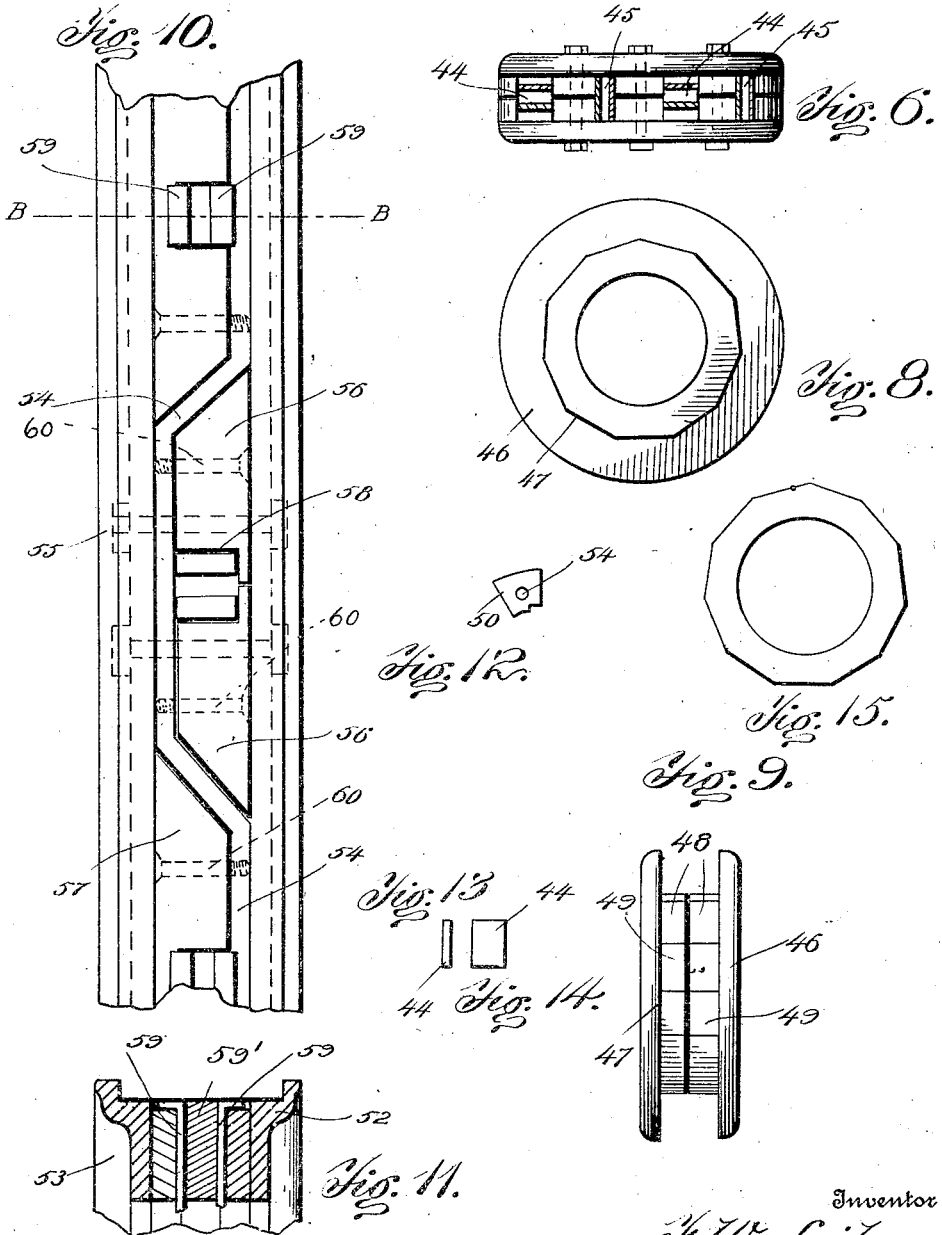

UNITED STATES PATENT OFFICE.

FREDERICK W. LEIB, OF MIDDLETOWN, OHIO.

WHEEL.

1,082,600.  Specification of Letters Patent.  Patented Dec. 30, 1913.

Application filed May 3, 1912. Serial No. 694,870.

*To all whom it may concern:*

Be it known that I, FREDERICK W. LEIB, a citizen of the United States, residing at Middletown, in the county of Butler and State of Ohio, have invented certain new and useful Improvements in Wheels, of which the following is a specification.

This invention relates to improvements in wheels and has for its object to provide a wheel having sufficient resiliency to absorb shocks thereto.

Another object of the invention is to provide a wheel having spring spokes connecting the rim and hub.

Another object of the invention is to provide a wheel having spokes formed of spring metal strips bowed apart at their central portion and gradually converging to the rim and hub ends thereof whereby great resiliency may be had. And still another object of the invention is to provide a wheel having spring spokes each consisting of a pair of oppositely bowed resilient members and each alternate pair of members arranged in opposing planes whereby dishing of the wheel will be prevented, and direct rotation of the parts assured.

With the above and other objects in view, I have invented the wheel illustrated in the accompanying drawings in which—

Figure 1 is an elevational view of my improved wheel, Fig. 2 is a sectional view taken on line A—A of Fig. 1, Fig. 3 is a plan view of a portion of a rim, Fig. 4 is an elevational view of the inner side of a hub section, Fig. 5 is a central sectional view of one form of a pair of hub forming sections, Fig. 6 is an edge view of another form of hub showing spokes in transverse sections, Fig. 7 is a view similar to Fig. 4 showing fragments of spoke members seated therein, Fig. 8 is an elevational view of the inner surface of a modified form, of an integral hub section, Fig. 9 is an edge view of a modified form of hub, Fig. 10 is a plan view of a portion of a modified form of rim, Fig. 11 is a sectional view taken on line B—B of Fig. 10, Fig. 12 is a detailed elevational view of a key member, Fig. 13 is a plan view of a spacer member, Fig. 14 is an elevational view of said spacer member, Fig. 15 is a face elevation of one of two separable members for spacing the end plates of the hub, and Fig. 16 is a view similar to Fig. 11 but showing the free ends of the spoke members wedged in position.

Like reference characters indicate like parts throughout the specification and in the several views in the drawings in which—

1 indicates a rim of a wheel formed of a pair of opposing members 2 and 3 having flanges 4 and 5 adapted to form a peripheral channel 6 in which is seated an annular band 7 to form a seat for the tire 8 and a bearing for the outer feet 9 and 10, 11 and 12 of the spoke members to be later described. The members 2 and 3 are held separated by fellies 13 and the fellies and rim sections are held together by means of bolts 14. The spokes of this wheel are formed of pairs of oppositely bowed resilient members 15 and 16 bowed in the plane of the wheel rim, and oppositely bowed members 17 and 18. These members have right-angular feet 9, 10, 11 and 12 and straight legs 19, 20 and 21 for the thickness of the fellies which they extend through but begin to bow outwardly as soon as they emerge from the fellies until at their central part they are farthest apart when they begin to converge toward the hub 23, until its edge is reached when the inner legs 25, 26, 27, and 28 are formed straight and are provided with right-angular feet 29, 30, 31 and 32 which bear upon the hub members 23.

The hub 23 is formed preferably of a pair of opposing sections 34 and 35 the former of which is provided with integral inwardly extending annular lugs 33 which are provided with a plurality of surfaces 36 against which the feet 29, 30, 31 and 32 bear. Slots 37 and 38 are provided in the members 34, and 35 to receive the straight legs 25, 26, 27 and 28. Those slots have right-angular extensions 39 and 40 to receive the feet 29, 30, 31 and 32. After the spoke members are put into place the two hub sections 34 and 35 and the collar 42 provided with the brake member 43 are all securely bolted together by the bolts 41. The opposing ends of spoke members are held apart by means of spreader blocks 44 and 45 by means of which the ends of the spokes are held fixedly and securely in the sockets. These blocks being wider than the length of the feet on the spoke members, by removing them the spokes may be withdrawn and replaced without taking the wheel apart, simply by bowing the member it is desired to remove or insert.

In Figs. 8 and 9 I illustrate a modified form of hub in which a pair of hub members 46 and 47 have inwardly projecting flanges, 48 which are polysided and form bearing surfaces 49 for spoke ends. Removable keys or blocks 50 are adapted to seat on the surfaces 49 of the members 46 and 47 and space the spoke ends apart and hold them in place. These blocks are provided with openings 54' to receive bolts (not shown) which are adapted to hold the several hub members together.

In Figs. 10 and 11 I show a modified form of rim construction in which a pair of opposing rim members 52 and 53 are spaced apart by a zigzag member 54 which is bolted to the rim members by the bolts 55 shown in dotted lines in Fig. 10. This zigzag arrangement of the member 54 provides spaces in which are placed blocks 56 and 57 having sockets 58 to receive the spoke ends 59. The blocks 56 and 57 may be secured to the member 54 by means of the bolts or screws 60. It will be noticed that in Fig. 11, the free ends of the spokes, 59, are formed with rectangular offsets bearing respectively upon the block 57 and member 54, a block 59' being inserted in the space intervening between the spokes 59 so as to secure said spokes in position when the screws 60 are tapped through said block 57, and member 54. However this means of fastening the spoke ends is also subserved by forming inclined surfaces upon the spoke ends as at 60' and upon the corresponding blocks upon which the spokes rest, so that said blocks may exert a wedging action against the offsets formed terminally on said spokes, when the screws 60 are clamped home. By means of this construction either one of the rim members 52 and 53 may be separated from the other portion of the wheel rim and any one of the blocks 56 and 57 removed without interfering with the other part of the rim structure.

My wheel as above described has its spring spokes so arranged that they begin to bow from the point of their projections from the rim and hub, thus the least pressure or shock will spread their opposing members apart and the greatest amount of resiliency is thus obtained. Every alternate pair of spoke members being arranged in the opposing planes assure the greatest strength in forming an extremely durable wheel. By reason of this construction there will be no chopping or wearing of parts, or dirt slots in any portion of the wheel.

Having now described my invention that which I claim to be new and desire to procure by Letters Patent is:

1. A wheel comprising a rim, hub and spokes, each of said spokes consisting of a pair of oppositely bowed resilient members having right angular ends, said rim and hub having sockets to receive said ends and removable spacer blocks adapted to lock said spoke members to said hub and rim, said blocks for each of said spokes being independent, said hub consisting of a pair of opposing plates, a polysided spacer on one of said plates forming surfaces against which the inner ends of said spoke members seat, every pair of said spoke members being disposed in a plane at right angles to the plane of their adjoining spoke members.

2. In a wheel, a hub having a plurality of peripheral surfaces, a rim and spokes seated on said surfaces and connected to said rim, said spokes being resilient and having right angular ends, the inner of said ends being seated on said surfaces, each of said spokes consisting of a pair of oppositely bowed members, every alternate pair of said members being disposed in the plane of said wheel.

3. In a wheel, a hub having a plurality of peripheral surfaces, a rim and spokes seated on said surfaces and connected to said rim, said spokes being resilient and having right angular ends, the inner of said ends being seated on said surfaces, each of said spokes consisting of a pair of oppositely bowed members, every alternate pair of said members being disposed in the plane of said wheel, said other pairs being disposed in a plane transversely of the plane of said wheel.

4. In a wheel, a hub having a plurality of peripheral surfaces, a rim and spokes seated on said surfaces and connected to said rim, said spokes being resilient and having right angular ends, the inner of said ends being seated on said surfaces, each of said spokes consisting of a pair of oppositely bowed members, every alternate pair of said members being disposed in the plane of said wheel, said other pairs being disposed in a plane transversely of the plane of said wheel, plates forming flanges on the opposing sides of said hub whereby said spokes are held in position.

5. In a wheel, a hub having a plurality of peripheral surfaces, a rim and spokes seated on said surfaces and connected to said rim, said spokes being resilient and having right angular ends, the inner of said ends being seated on said surfaces, each of said spokes consisting of a pair of oppositely bowed members, every alternate pair of said members being disposed in the plane of said wheel, said other pairs being disposed in a plane transversely of the plane of said wheel, plates forming flanges on the opposing sides of said hub whereby said spokes are held thereon, said plates having oppositely disposed slots into which said right angular ends of said transversely bowed members are held.

6. In a wheel, a hub having a plurality of peripheral surfaces, a rim and spokes seated on said surfaces and connected to said rim, said spokes being resilient and having right angular ends, the inner of said ends being seated on said surfaces, each of said spokes consisting of a pair of oppositely bowed members, every alternate pair of said members being disposed in the plane of said wheel, said other pairs being disposed in a plane transversely of the plane of said wheel, plates forming flanges on the opposing sides of said hub whereby said spokes are held thereon, said plates having oppositely disposed slots into which said right angular ends of said transversely bowed members are held, independent blocks interposed between said last named members whereby said ends are held in said slots and whereby a single of said members may be removed by removing one of said blocks.

7. In a wheel, a hub having a plurality of peripheral surfaces, a rim and spokes seated on said surfaces and connected to said rim, said spokes being resilient and having right angular ends, the inner of said ends being seated on said surfaces, each of said spokes consisting of a pair of oppositely bowed members, every alternate pair of said members being disposed in the plane of said wheel, said other pairs being disposed in a plane transversely of the plane of said wheel, plates forming flanges on the opposing sides of said hub whereby said spokes are held thereon, said plates having oppositely disposed slots into which said right angular ends of said transversely bowed members are held, independent blocks interposed between said last named members whereby said ends are held in said slots and whereby a single of said members may be removed by removing one of said blocks, oppositely disposed blocks having opposing recesses adapted to receive the right angular ends of said members disposed in the plane of said wheel.

8. In a wheel, a hub having a plurality of peripheral surfaces, a rim and spokes seated on said surfaces and connected to said rim, said spokes being resilient and having right angular ends, the inner of said ends being seated on said surfaces, each of said spokes consisting of a pair of oppositely bowed members, every alternate pair of said members being disposed in the plane of said wheel, said other pairs being disposed in a plane transversely of the plane of said wheel, plates forming flanges on the opposing sides of said hub whereby said spokes are held thereon, said plates having oppositely disposed slots into which said right angular ends of said transversely bowed members are held, independent blocks interposed between said last named members whereby said ends are held in said slots and whereby a single of said members may be removed by removing one of said blocks, oppositely disposed blocks having opposing recesses adapted to receive the right angular ends of said members disposed in the plane of said wheel, and independent blocks transverse to said first blocks adapted to seat between the ends of said last named members to hold said right angular ends thereof in their recesses.

In testimony whereof I affix my signature in presence of two witnesses.

FREDERICK W. LEIB.

Witnesses:
  CLINTON D. BOYD,
  W. G. PALMER.